United States Patent [19]

Kume et al.

[11] Patent Number: 5,426,477

[45] Date of Patent: Jun. 20, 1995

[54] PHOTOGRAPHIC IMAGE SIZE SWITCHING CAMERA

[75] Inventors: Hideaki Kume; Yasuo Asakura, both of Hachioji; Shunji Matsutani, Akishima, all of Japan

[73] Assignee: Olympus Optical Co., Ltd., Tokyo, Japan

[21] Appl. No.: 20,580

[22] Filed: Feb. 22, 1993

[30] Foreign Application Priority Data

Feb. 20, 1992 [JP] Japan .................................. 4-033564

[51] Int. Cl.⁶ ............................................ G03B 17/24
[52] U.S. Cl. .................................................. 354/106
[58] Field of Search ............... 354/159, 105, 106, 107, 354/108, 21, 94

[56] References Cited

U.S. PATENT DOCUMENTS 5,204,707  3/1993  Harvey ........................... 354/106 X

FOREIGN PATENT DOCUMENTS 1-233431 of 1989 Japan .
2-195344 of 1990 Japan .
3-6546 of 1991 Japan .

Primary Examiner—Howard B. Blankenship
Attorney, Agent, or Firm—Louis Weinstein

[57] ABSTRACT

A photographic camera capable of switching the size of a photographic image includes a photographic image size information display device for displaying information on the size of a photographed image on a tongue portion of the film and/or a film cartridge in which the film is loaded. The photographic image size information display device includes a device for printing a printing type in accordance with the photographic image size, and a marking device for making a mark using a laser. Information on the photographic image size can be displayed automatically by this camera using these devices. As a result, no special inconvenience is given to a photographer, and the photographic image size can be reliably recognized in a processing laboratory.

12 Claims, 8 Drawing Sheets

PHOTOGRAPHIC IMAGE SIZE SWITCHING CAMERA

BACKGROUND OF THE INVENTION

1. Field of the Invention

The present invention relates to a photographic image size switching camera and, more particularly, to a photographic image size switching camera having means for clearly showing information on the size of a photographic image to third parties, in particular, processing laboratories.

2. Description of the Related Art

In recent years, cameras have been commercialized which are capable of taking a pseudo-panoramic photograph by forming a rectangular photographic image having the upper and lower portions of the photographic image of an ordinary standard size (24×36 mm) as non-exposed portions by using a JIS135 film and printing this photographic image. Some of these cameras make it possible-to take photographs in which photographed images of both a standard size and a panoramic size are present on one roll of loaded film.

Progress in camera automation has been made in film processing laboratories. There are some processing laboratories in which an automation apparatus which automatically performs all the photography steps from film development to printing has been introduced.

However, the above automation apparatus has disadvantages in that since only printed images of one size can be obtained, a size of a printed image photographed in the panoramic size desired by the user cannot be obtained, and an unnatural photograph having a black zone in the upper and lower portions thereof is obtained, in a case where if, for example, film which includes photographic images of the standard size and panoramic size described above is printed automatically in the standard image size.

Therefore, when one roll of film includes photographed images of different sizes as described above, such printing mistakes as described above must be prevented by, for example, switching a printing process to a manual operation in a developing laboratory. Thus, there has arisen the necessity to know the size of photographed images within a film to be developed.

As a result, in recent years, before film is submitted to a processing laboratory, an "identification seal" indicating that a panoramic photograph has been taken has been attached on the outer peripheral surface of a film cartridge by the photographer. Thus, the processing laboratory knows the photographed image size on the basis of the information on the "identification seal".

However, such image size determination method in which an "identification seal" has to be attached on the surface of a film cartridge, is inconvenient to a photographer. In addition, the method lacks accuracy, for example, the photographer may attach a wrong seal by mistake or forget to attach a seal.

SUMMARY OF THE INVENTION

A first object of the present invention is to provide a photographic image size switching camera which is capable of recognizing the size of a photographed image in the film.

A second object of the present invention is to provide a photographic image size switching camera which is not inconvenient to a photographer and from which a film whose photographic image size can be reliably recognized can be given to a processing laboratory.

A third object of the present invention is to provide a photographic image size switching camera which is not inconvenient to a photographer and from which a film whose photographic image sizes (standard size and panoramic size) can be reliably recognized can be given to a processing laboratory.

A fourth object of the present invention is to provide a photographic image size switching camera from which a film whose photographic image size can be reliably recognized can be given to a processing laboratory when a cartridge or the tongue of a film is visible.

A fifth object of the present invention is to provide a photographic image size switching camera from which a film whose photographic image sizes (standard size and panoramic size) can be reliably recognized can be given to a processing laboratory when a cartridge or the tongue (also referred to as a leader portion) of a film is visible.

A sixth object of the present invention is to provide a photographic image size switching camera from which a film whose photographic image sizes can be reliably recognized can be given to a processing laboratory even when the film must be taken out before all of the film has been used.

In order to achieve the above object, a photographic image size switching camera in accordance with the present invention is provided, which camera comprises marking means for marking photographic image size information in the form of characters or other such indicia on either a film or a cartridge in which the film is housed. As a result, the photographic image size can be recognized.

These objects and advantages of the present invention will become further apparent from the following detailed explanation.

DETAILED DESCRIPTION OF THE PREFERRED EMBODIMENTS

Figure 1:
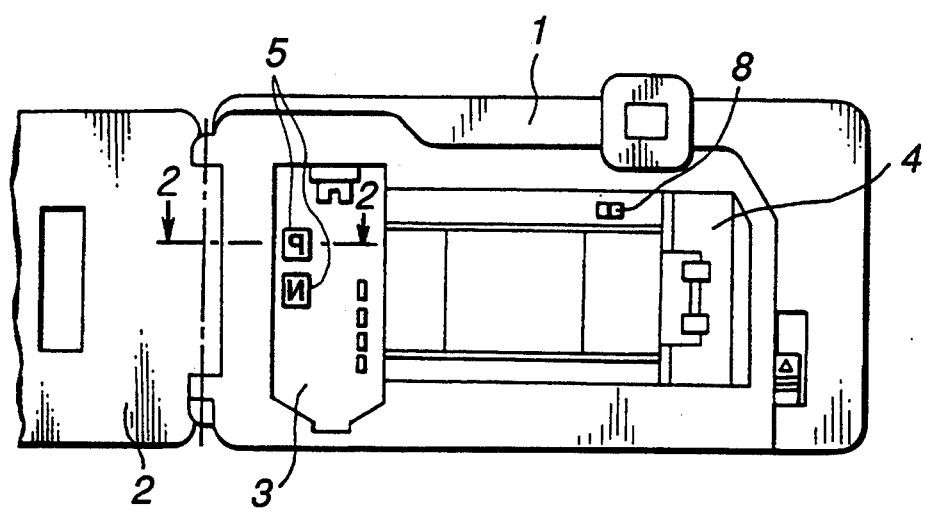
FIG. 1 is a rear view of a photographic image size switching camera, illustrating a state in which the rear lid of the photographic image size switching camera is open, according to a first embodiment of the present invention.

Preferred embodiments of the present invention will be explained below with reference to the accompanying drawings.

In the present invention, a film cartridge refers to a film cartridge including a spool therein.

The first embodiment will now be explained with reference to FIG. 1.

A camera body 1 comprises a rear lid 2, a cartridge chamber 3, a take-up spool 4, two stamps 5 for printing identification marks, which will be explained later, on the peripheral surface of a loaded film cartridge, and a photoreflector 8.

The two stamps 5 are each buried in a hole provided on an inner wall surface of the cartridge chamber 3 in such a manner as to be slidable in a direction in which the printing surfaces of the stamps face the outer peripheral surface of the loaded film cartridge. As shown in FIG. 1, one of the two stamps 5 has a printing surface of a character "P" which is laterally inverted, and the other has a printing surface of a character "N" which is laterally inverted, which surfaces are operated independently of each other. When the printing surfaces are respectively brought into contact with the outer peripheral surface of the film cartridge, the recognition mark of a character "P" or "N" (hereinafter referred to as a P or N mark, respectively) is printed on the outer peripheral surface.

Figure 2:
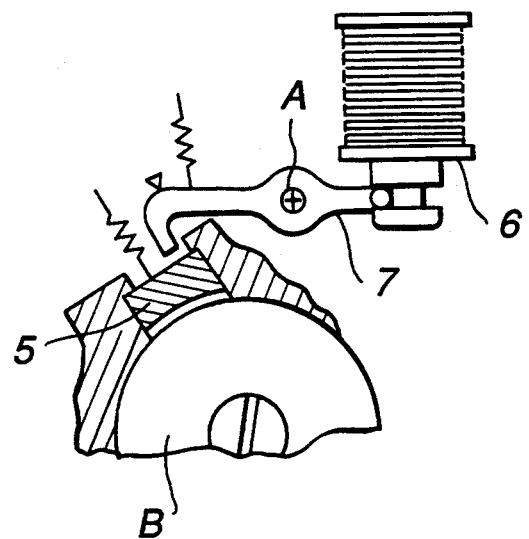
FIG. 2 is a sectional view taken along the line 2—2 of FIG. 1.

FIG. 2 is a sectional view taken along the line 2—2 of FIG. 1.

As shown in FIG. 2, a driving section is formed of a plunger 6 and a lever 7. A set comprising the plunger 6 and the lever 7 is disposed at respective positions facing the two stamps 5 in front of the cartridge chamber 3 within the camera body 1. The lever 7 is pivoted on a fixed shaft A within the camera body 1, and one end of the lever 7 is disposed so as to curve and face the rear surface of the printing surfaces of the stamps 5. The other end of the lever 7 is rotatably pivoted on a movable portion at the extreme end portion of the plunger 6 fixedly mounted within the camera body 1. The driving of the plunger 6 causes the one end of the lever 7 to press against the rear surface. As a result, the printing surfaces of the stamps 5 slide along the inner wall of the hole and project onto the inner wall surface of the cartridge chamber 3. Thus, the printing surfaces are respectively brought into contact with the peripheral surface of a loaded film cartridge B, the P or N mark being printed on the peripheral surface of the film cartridge.

The photoreflector 8 is disposed at a position corresponding to the perforation passage of the film. Pulse signals generated as the perforations are moved are sent out to a CPU 51 to be described later. The CPU 51 detects the position of the film on the basis of these pulse signals.

Figure 8:
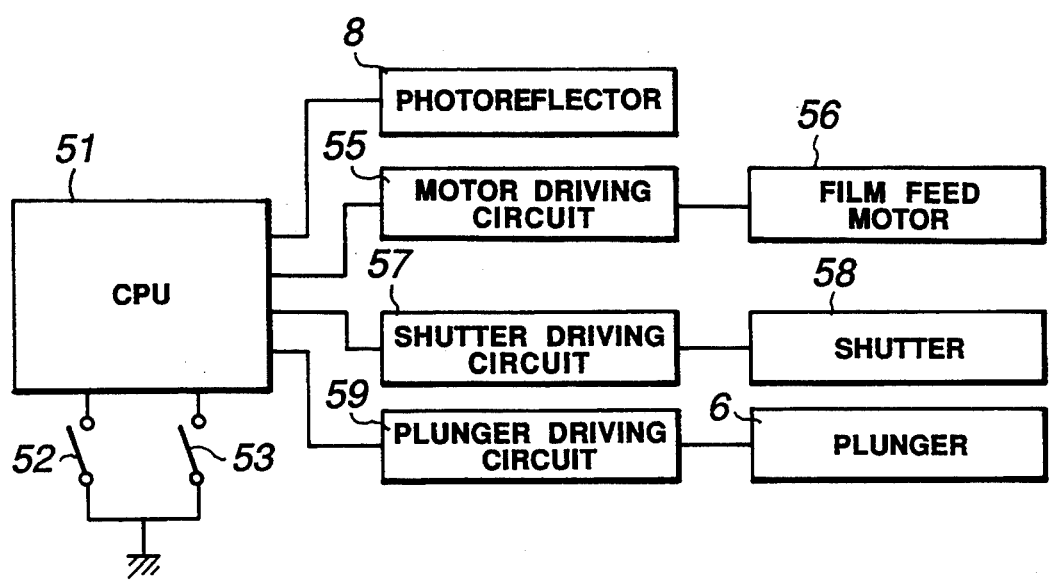
FIG. 8 is a block circuit diagram illustrating the circuitry of the photographic image size switching camera of the first embodiment of the present invention.

FIG. 8 is a block circuit diagram illustrating the main portion of the first embodiment.

In FIG. 8, reference numeral 52 denotes a release switch (hereinafter referred to an RSW) which is turned on when the release button of the camera is pressed. Reference numeral 53 denotes a panorama switch (hereinafter referred to as a PSW) which is turned on when the photographic image size of the camera is switched to a panorama size by an unillustrated mechanism. The status of the photoreflector 8, the RSW 52 and the PSW 53 are input to an input port of the CPU 51.

A motor driving circuit 55, a shutter driving circuit 57, and a plunger driving circuit 59 are connected to the output terminal of the CPU 51. A film feed motor 56, a shutter 58, and the plunger 6 are connected to the output terminals of the above driving circuits, respectively.

The film feed motor 56 winds up a film when the motor 56 rotates forwardly through a well-known driving mechanism in accordance with signals output from the CPU 51 and rewinds the film when the motor 56 rotates backwardly. The shutter 58 performs a shutter operation in accordance with a signal from the CPU 51, and the plunger 6 performs a printing operation in accordance with a signal from the CPU 51.

Next, the operation of the first embodiment will be explained with reference to the flowchart shown in FIG. 9.

First, when a film cartridge is set in the camera body 1, the film therein is autoloaded in step S101. Next, when it is detected in step S102 that a shutter has been released, the CPU 51 outputs a signal to the shutter driving circuit 57 in step S103 so that an exposure operation is performed. A determination is made in step S104 whether the photographed image size of the exposed frame is a panoramic or normal size. When the size is a panoramic size, a P flag is set in a RAM within the CPU 51 in step S105.

When, however, the photographed image size is a normal size, an N flag is set in the RAM in step S106. Thereafter, the CPU 51 outputs a signal to the motor driving circuit 55 in step S107, and advances one frame of the film while monitoring the photoreflector 8. When it is determined in step S108 that the end of film has not been reached, the process returns to step S102.

When the CPU 51 determines in step S108 that the end of film has been reached while monitoring the photoreflector 8, the statuses of P and N flags are checked in steps S109 and 110, respectively. When photographed images of both a panoramic size and a normal size are present, the CPU 51 outputs a signal to the plunger driving circuit 59 in steps S111 and S112 so that a P and an N mark are in turn printed on the peripheral surface of the film cartridge by the operation of respective plungers 6.

If all the photographs taken are of a panoramic size, only a P mark is printed on the peripheral surface of the film cartridge in step S113. If all the photographs taken are of a normal size, only an N mark is printed on the peripheral surface of the film cartridge in step S114. Thereafter, the P and N flag are reset in step S115. The CPU 51 outputs a signal to the motor driving circuit 55 in step S116 so that the film feed motor 56 is driven in reverse to rewind the film. When all the photographs taken are of a normal size, step S114 may be omitted so that a photograph of a panoramic size can be discriminated from those of a normal size by printing no identification mark.

Next, an explanation will be given of the second embodiment of the present invention.

Since the construction of the second embodiment is similar to that of the first embodiment with only the respective operations thereof being different, only the operation of the second embodiment will be explained below.

Figure 10:
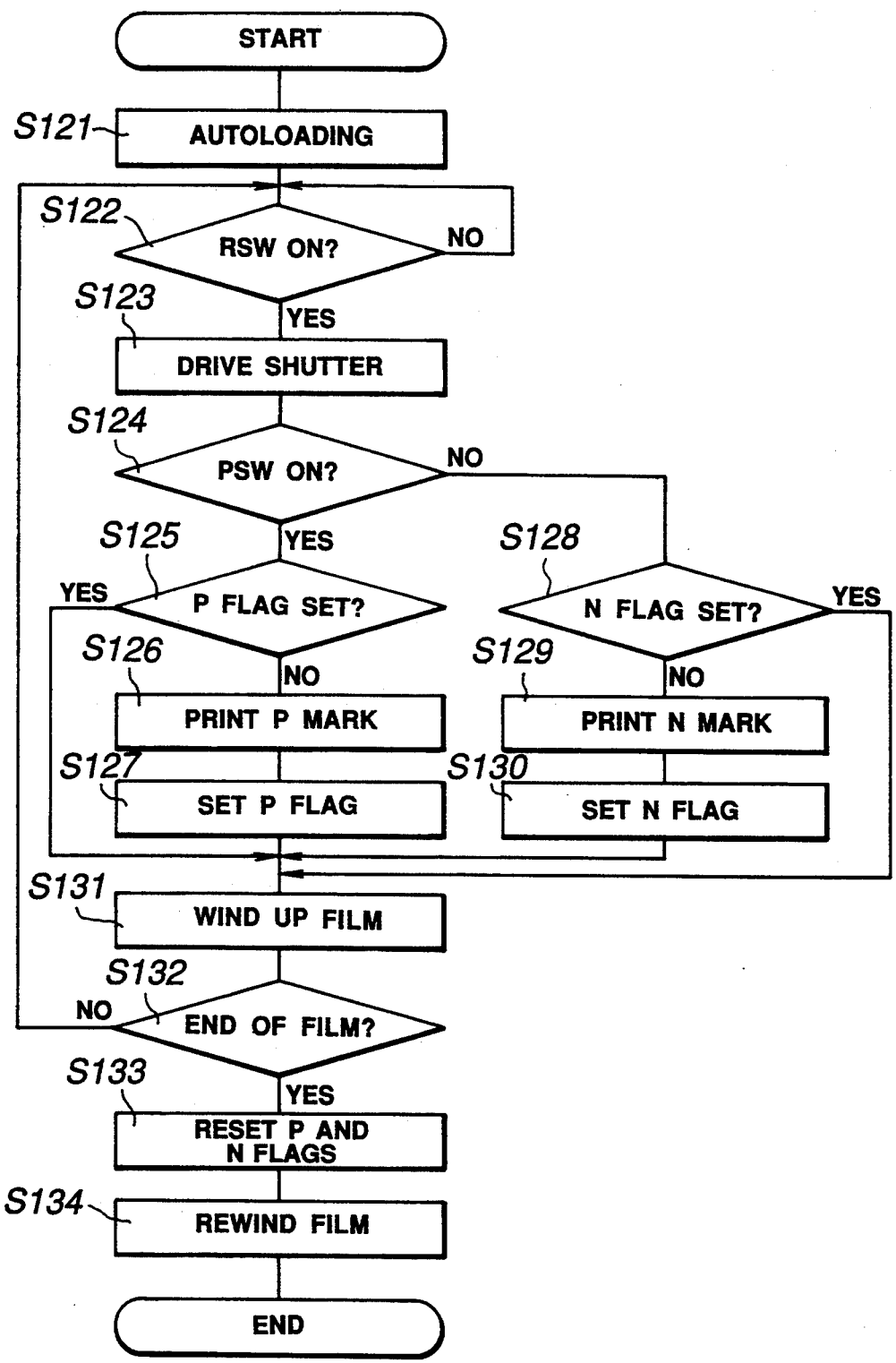
FIG. 10 is a flowchart showing the operation of the photographic image size switching camera of the second embodiment of the present invention.
Figure 11:
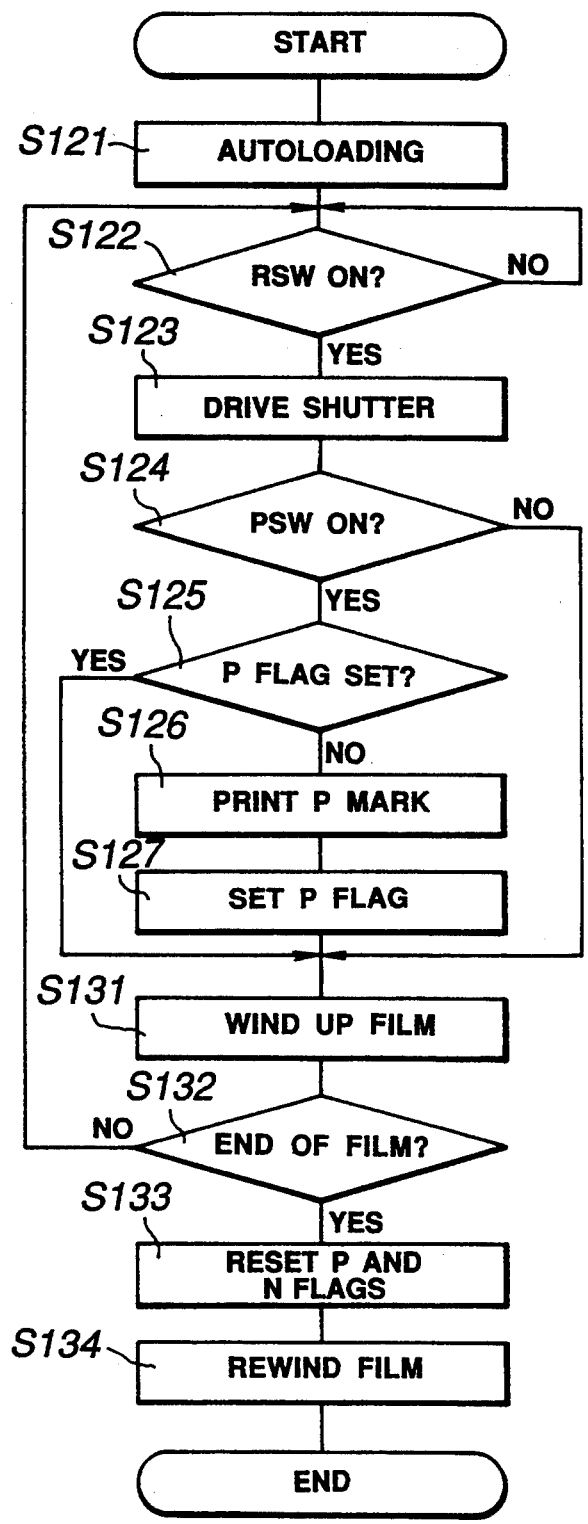
FIG. 11 is a flowchart showing another example of the operation of the photographic image size switching camera shown in FIG. 10.

FIG. 10 is a flowchart showing the operation of a photographic image size switching camera according to the second embodiment of the present invention.

First, when a film cartridge is set in the camera body, the film is autoloaded in step S121. Next, when it is detected in step S122 that the shutter has been released, the CPU 51 outputs a signal to a shutter driving circuit 57 in step S123 so that an exposure operation is performed. A determination is made in step S124 whether the size of the photographed image of the exposed frame is a panoramic or normal size.

When the photographed image size is a panoramic size, a determination is made in step S125 whether a P flag has been set in the RAM of the CPU 51. When the P flag has not been set, it is determined that the first photograph in the panoramic size has been taken. In step S126, the CPU 51 outputs a signal to the plunger driving circuit 59 so that the plunger 6 is driven to print a P mark on the peripheral surface of the film cartridge. A P flag is set in the RAM of the CPU 51 in step S127. When the image is photographed in the panoramic size at the second time or later, the set status of the P flag is checked in step S125, and steps S126 and S127 are bypassed.

In contrast, when it is determined in step S124 that the image is of a normal size, a determination is made in step S128 whether an N flag has been set in the RAM of the CPU 51. If an N flag has not been set, it is determined that the image is the first photograph in the normal size. In step S129, the CPU 51 outputs a signal to the plunger driving circuit 59 so that the plunger 6 is driven to print an N mark on the peripheral surface of the film cartridge. In step S130, an N flag is set in the RAM of the CPU 51. When it is a photograph in the normal size at the second time or later, steps S129 and S130 are bypassed the same manner as above.

Next, one frame of film is advanced in step S131. When the end of film has not been reached, the process returns to step S122. When the end of film is detected in step S132, the P and N flags are reset in step S133, and the film is rewound at step S134.

Since in the second embodiment the photographed state is reliably printed on the peripheral surface of a film cartridge immediately after each frame is photographed, the photographed state can be reliably known in a processing laboratory even if the power supply runs short when all the film has not been used, the film cannot be fed, and the film must be taken out in a dark box.

Although a P and an N mark are printed in the above-described embodiment, a P mark may be printed when a photograph is taken in the panoramic size even once, and no mark may be printed when a panoramic-size photograph is not taken only once.

Next, the third embodiment of the present invention will be explained.

Figure 3:
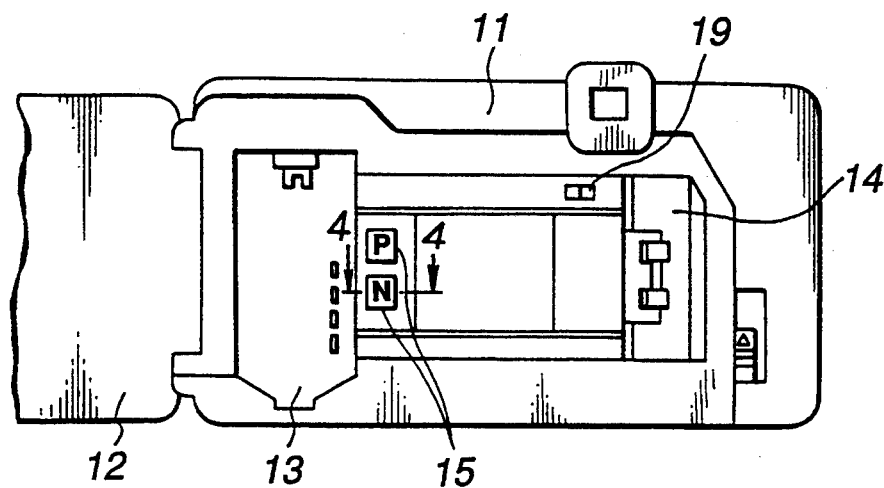
FIG. 3 is a rear view of a photographic image size switching camera, illustrating a state in which the rear lid of the photographic image size switching camera is open, according to a third embodiment of the present invention.

FIG. 3 is a rear view of a photographic image size switching camera illustrating a state in which the rear lid of the photographic image size switching camera is open, according to the third embodiment of the present invention.

As shown in the figure, a camera body 11 comprises a rear lid 12, a cartridge chamber 13, a take-up spool 14, two stamps 15 for printing identification marks similar to those of the first embodiment on a tongue of a loaded film, and a photoreflector 19 for detecting the feeding state of the film.

The two stamps 15 are each buried in a hole provided on the inner wall surface between an aperture of the camera body 11 and the cartridge chamber 3 in such a manner as to be slidable in a direction in which the printing surfaces of the stamps face the film surface of the tongue portion 18 (see FIG. 4) of the loaded film. As shown in FIG. 3, one of the two stamps 15 has a printing surface of a character "P", and the other has a printing surface of a character "N", the surfaces being operated independently of each other by a driving section which will be described later. When each printing surface is brought into contact with the film surface of the tongue portion 18 of the film, the identification mark of a character "P" or "N" (hereinafter referred to as a P or N mark, respectively) which is the same as in the first embodiment, is printed on the film surface of the film cartridge.

Figure 4:
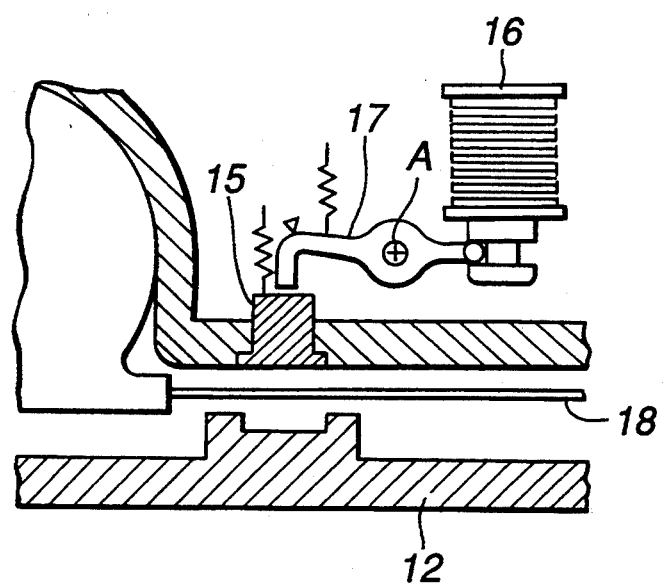
FIG. 4 is a sectional view taken along the line 4—4 of FIG. 3.

FIG. 4 is a sectional view taken along the line 4—4 of FIG. 3.

As shown in FIG. 4, the driving section is formed of a plunger 16 and a lever 17. A set comprising the plunger 16 and the lever 17 is disposed at positions facing the rear surface of the printing surface of the two stamps 15 within the camera body 11, one such set corresponding to each stamp. As in the first embodiment, the lever 17 is pivoted on a fixed shaft A within the camera body 11, and one end of the lever 17 is disposed so as to curve and face the rear surface of the printing surface of the stamps 15. The other end of the lever 17 is rotatably pivoted on a movable portion at the extreme end portion of the plunger 16 fixedly mounted within the camera body 11. The driving of the plunger 6 causes one end of the lever 17 to press against the rear surface. As a result, the printing surfaces of the stamps 15 slide along the inner wall of the hole provided and project onto the film feeding surface. The printing surface is brought into contact with the film surface of the tongue portion 18 of the loaded film, a P or N mark being printed on the peripheral surface of the film cartridge.

The photoreflector 19 is disposed at a position corresponding to the perforation passage of the film, and sends out a pulse signal to the CPU 51 as the perforations are moved in the same manner as in the first embodiment. The CPU 51 detects the position of the film on the basis of this pulse signal. The CPU 51 performs a rewinding control so that a small amount of the tongue portion 18 of the film is left from the film cartridge when the film is substantially completely rewound.

The circuitry of the third embodiment is similar to that shown in FIG. 8. Components in the third embodiment are the same as those in FIG. 8 except that the photoreflector 8 is replaced with the photoreflector 19 and the plunger 6 is replaced with the plunger 16.

Figure 12:
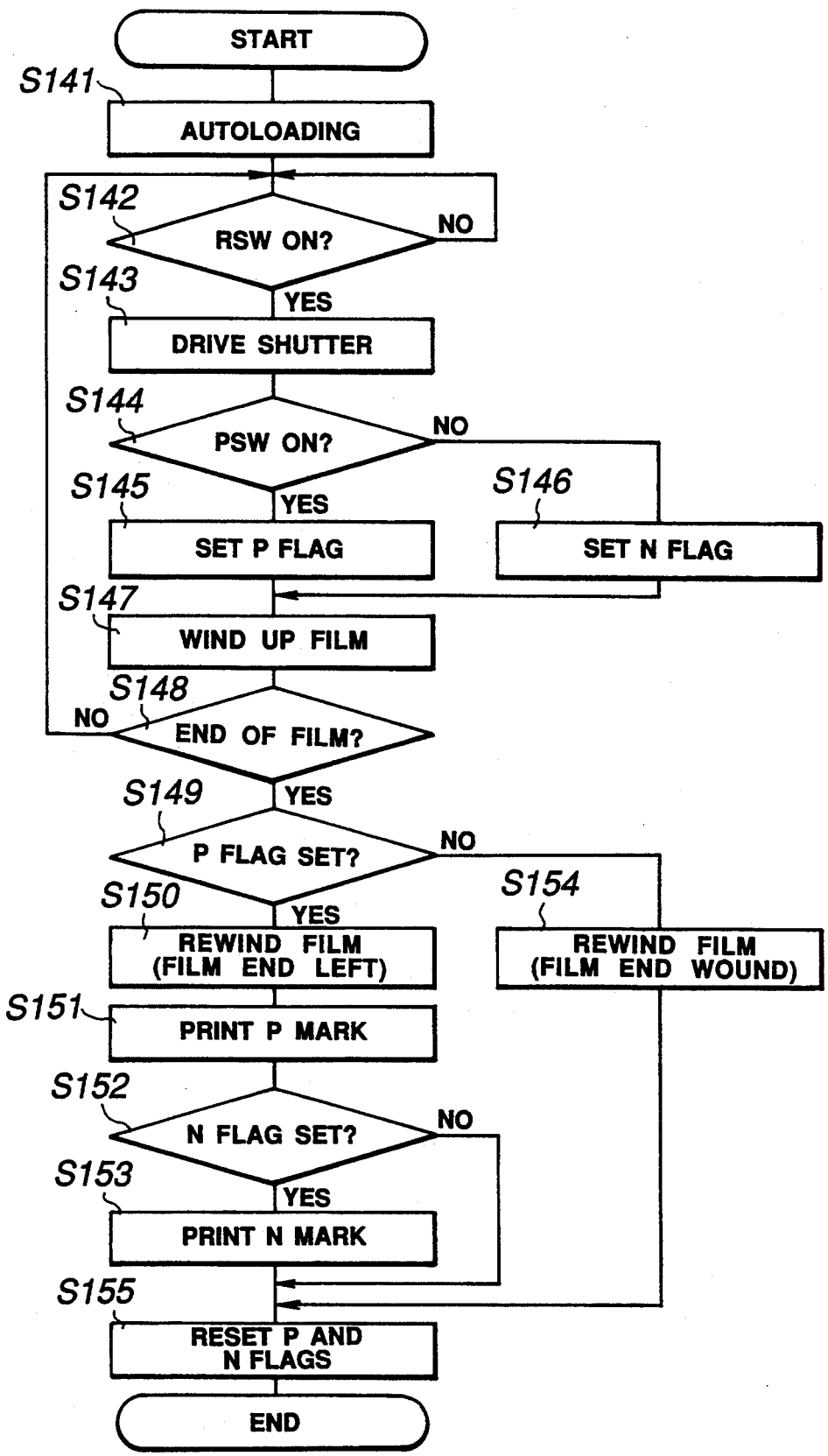
FIG. 12 is a flowchart showing the operation of the photographic image size switching camera of the third embodiment of the present invention.

Next, the operation of the third embodiment will be explained with reference to the flowchart shown in FIG. 12.

Steps S141 to S148 are respectively the same as steps S101 to S108 of the first embodiment. Therefore, an explanation of these steps is omitted here.

If it is determined in step S149 that a P flag has been set in the RAM of the CPU 51, the film is rewound in step S150. At this time, the CPU 51 controls so that the rewinding is terminated in a condition in which a small amount of the tongue portion 18 of the film is left from the film cartridge while the CPU 51 is monitoring the photoreflector 19.

Next, in step S151, the CPU 51 outputs a signal to the plunger driving circuits 59 so that the plunger 19 is operated to print a P mark on the film surface of the tongue portion 18 of the film. Next, when it is determined in step S152 that an N flag has been set in the RAM of the CPU 51, an N mark is printed on the film surface-in step S153 in the same manner as above.

In contrast, when it is determined in step S149 that the P flag has not been set, the film is rewound in step S154 so that the film is completely housed within the film cartridge without leaving the tongue portion 18 of the film. After the series of operations described above-,are finished, the CPU 51 resets the P and N flags in step S155. This terminates the operation.

In the third embodiment, when all the film is photographed in the normal size, the film is wound in so that the tongue portion 18 thereof is housed within the film cartridge. When all the film is photographed in the panoramic size, the tongue portion 18 is left extending from the film cartridge, and a P mark is printed on the film surface of the tongue portion 18. In contrast, when photographic images of both the normal and panoramic sizes are present the tongue portion 18 of the film is left extending from the film cartridge, and P and N marks are printed on the film surface of the tongue portion 18. Thus, the third embodiment has an advantage in that a photographed state can be determined more easily.

Next, the operation of the fourth embodiment of the present invention will be explained.

Figure 5:
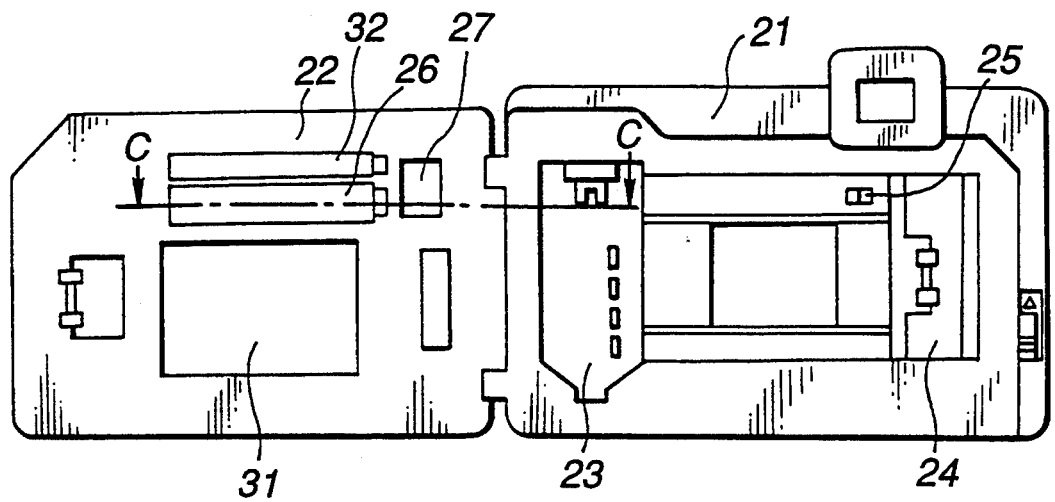
FIG. 5 is a rear view of a photographic image size switching camera, illustrating a state in which the rear lid of the photographic image size switching camera is open, according to a fourth embodiment of the present invention.
Figure 6:
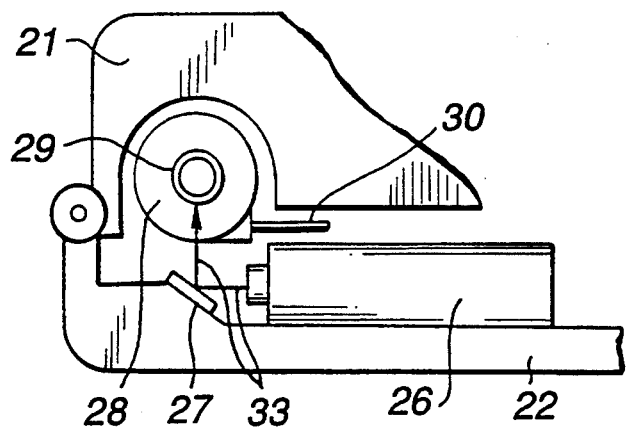
FIG. 6 is a sectional view taken along the line 6—6 of FIG. 5.

FIG. 5 is a rear view illustrating a state in which a rear lid of a photographic image size switching camera is open according to the fourth embodiment of the present invention. FIG. 6 is a sectional view taken along the line 6—6 of FIG. 5, illustrating a state in which the rear lid is closed.

As shown in FIG. 5, a camera body 21 comprises a rear lid 22, a cartridge chamber 23, a spool 24, two laser beam sources 26 and 32 for printing identification marks on the peripheral surface on the extreme end portion of the spool of a loaded film cartridge, a mirror 27 for reflecting a light beam sent out from the laser beam sources 26 and 32 and accurately irradiating the light beam onto the peripheral surface on the extreme end portion of the spool of the film cartridge, a photoreflector 25 for detecting a film feeding state, and a pressure plate 31.

Figure 7:
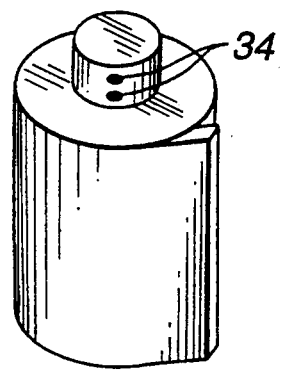
FIG. 7 is a perspective view illustrating an identification mark printed in a film cartridge in the fourth embodiment.

The two laser beam sources 26 and 32 are disposed side by side in the center of the upper portion of the rear lid 22 in such a way that the irradiation port is made parallel to the lateral direction of the camera body 21. The two laser beam sources 26 and 32 are operated independently of each other by an unillustrated driving source and emit laser beams. The mirror 27 is disposed at a position at which a laser beam 33 emitted from the laser beam sources 26 and 32 is accurately irradiated onto the peripheral surface of an extreme end portion 29 of the spool of the film cartridge 28. The irradiation of the laser beam 33 onto the peripheral surface of the extreme end portion 29 causes an irradiated portion to melt, an identification mark 34, shown in FIG. 7, being printed.

The circuitry of the fourth embodiment is similar to that shown in FIG. 8 except that the plunger driving circuit 59 and the plunger 6 are replaced with the laser beam sources 26 and 32.

Figure 9:
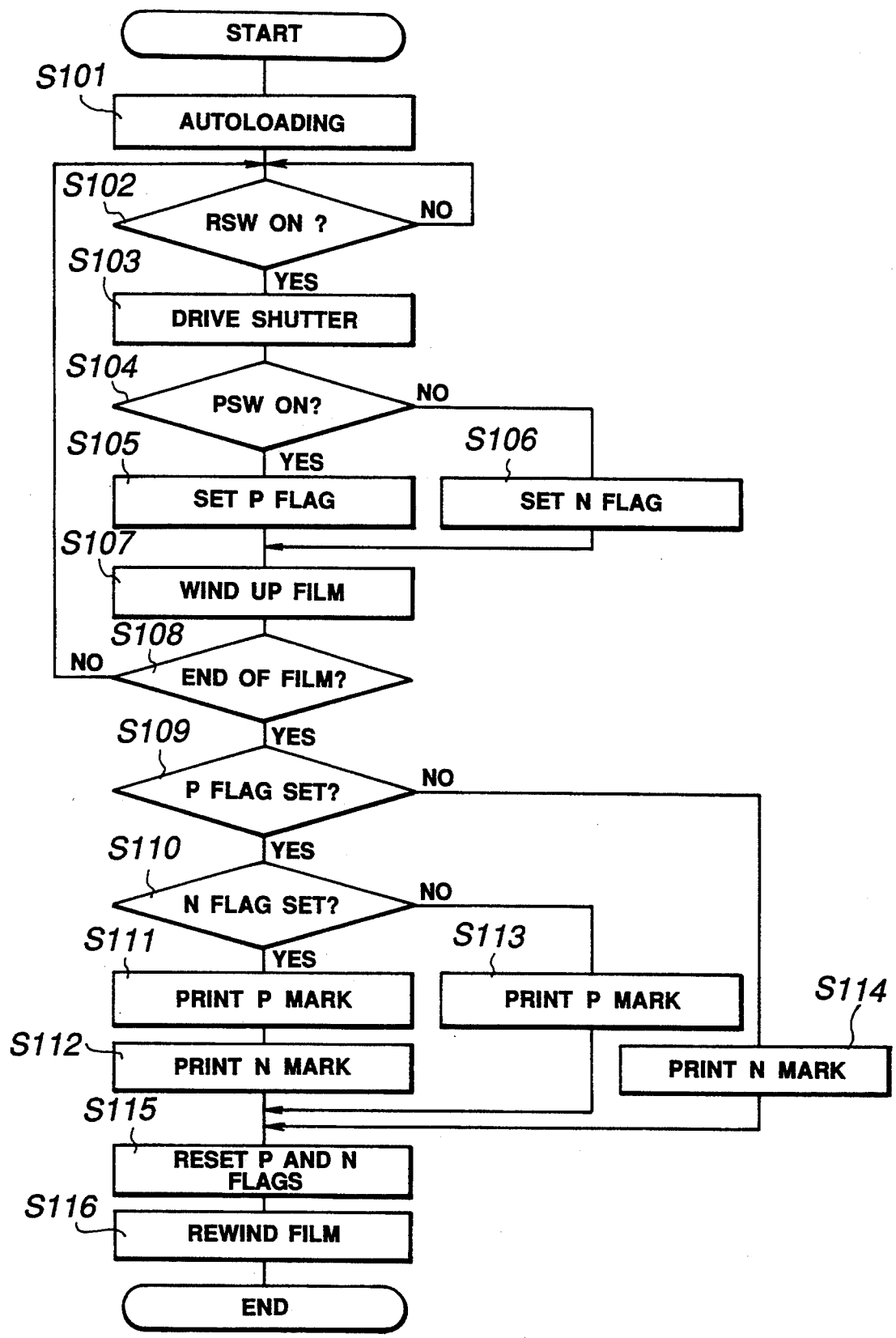
FIG. 9 is a flowchart showing the operation of the photographic image size switching camera of the first embodiment of the present invention.

The operation of the fourth embodiment proceeds in the same flow as the flowchart shown in FIG. 9. The laser beam 33 is supplied instead of driving the plunger 6 when a P or an N mark is printed in steps S111 to S114 in FIG. 9. As described above, the identification mark 34 shown in FIG. 7 is printed on the extreme end portion 29 of the spool of the film cartridge. This identification mark 34 makes it possible to know the photographic image size in a processing laboratory as in the first to third embodiments.

It is possible to provide a recessed portion by applying a pressing force on the peripheral surface of a film cartridge, or by peeling off the coating on the peripheral surface of a film cartridge, as a method of attaching an identification mark on t he film surface. It is also possible to attach a sheet which changes its color when pressure or heat is applied thereto on the film cartridge, or applying a coating having the above-described characteristics to which pressure or heat is applied from the camera. In addition, it is possible to expose the above-mentioned identification marks with an LED or the like.

In this invention, it is apparent that working modes different in a wide range can be formed on this basis of this invention without departing from the spirit and scope of the invention. This invention is not restricted by any specific embodiment except as may be limited by the appended claims.

What is claimed is:

1. A camera capable of switching size of a photographic image between a first image size and second image size which is different from the first image size, comprising:
    a first identification mark for indicating a first image size photograph;
    a second identification mark for indicating a second image size photograph;
    first driving means which enters an operating state responsive to a signal indicating that all frames of a film have been completely used and prints said first identification mark on an outer surface of a cartridge when a first image size photograph is set; and
    second driving means which enters an operating state responsive to a signal indicating that all frames of a film have been completely used and prints said second identification mark on an outer surface of a cartridge when a second image size photograph is set.

2. A camera capable of switching a size of a photographic image between a first image size and a second image size which is different from the first image size, comprising:
    image size information display means for marking an exterior of a film cartridge loaded into the camera; and
    control means for determining when a photograph is taken whether an image size thereof is a first or a second image size and operating the image size information display means when the photograph is a first photograph of the second image size.

3. A camera according to claim 2, wherein the first image size is a standard size and the second image size is a panoramic image size.

4. A camera capable of switching a size of a photographic image between a first image size and a second image size which is different from the first image size, comprising:

photographic image size information display means having first photographic image size display means for displaying a size of a photographed image on an exterior of a film cartridge loaded into a camera and a second photographic image size display means which displays a size of a photographed image different from the first-mentioned image size; and control means for operating said first image size display means when a photograph of said first image size is taken and operating said second image size display means when a photograph of said second image size is taken, after all frames of the film have been completed.

5. A camera capable of switching a size of a photographic image, comprising:

photographic image size information display means for displaying that a photographic image size different from a normal photographic image size has been exposed on an exterior of a film cartridge loaded into the camera; and control means for determining, after photographic light is exposed onto frames of a film within said film cartridge and exposure of all frames of the film in the cartridge has been completed, whether an image size different from said normal photographic image size has been included among the exposed frames, said photographic image size information display means displaying photographic image size information responsive to said control means when a result of a determination shows that an image size different from said normal photographic image size has been included among the exposed frames.

6. A camera capable of switching a size of a photographic image, comprising:

photographic image size information display means for displaying that an exposure has been performed in a photographic image size different from a normal photographic image size on an exterior of a film cartridge loaded into a camera;

film rewinding means for rewinding a film within a film cartridge; and control means for determining, after photographic light is exposed onto frames of a film within said film cartridge and exposure of all framed of said cartridge has been completed, whether an image size different from said normal photographic image size has been included among the exposed frames, wherein when an image size different from said normal photographic image size has not been included among the exposed frames, an exposed film is totally wound within said cartridge by said film rewinding means, when an image size different from said normal photographic image size has been included among the exposed frames, a film is rewound within said cartridge with a tongue portion of a film extending from said cartridge by said film rewinding means, and thereafter a size of a photographic image is displayed on the extended tongue portion by said photographic image size information display means.

7. A camera capable of switching the size of a photographic image between a first image size and a second image size which is different from the first image size, comprising:

photographic image size information display means having first photographic image size display means for displaying a size of a photographed image on a film cartridge loaded into a camera and a second photographic image size display means for displaying a size of a photographed image different from the first-mentioned image size on a film cartridge; and control means for operating said first image size display means when a photograph is taken in said first image size and operating said second image size display means when a photograph is taken in said second image size, after a film is rewound in a cartridge.

8. A method for operating a camera capable of switching a size of a photographing image between a first image size and a second image size which is different from the first image size comprising first marking means making a first identification mark representing a first image size photograph, second marking means for making a second identification mark representing a second image size photograph, said method comprising the steps of:

(a) determining the image size selected for each photographing operation and storing the selected image size;

(b) determining if an end of film has been reached;

(c) operating said first marking means to print only said first mark on an exterior of a film cartridge containing said film when only said first image size is stored;

(d) operating said second marking means to print only said second identification mark on an exterior of a film cartridge containing said film when only said second image size is stored; and (e) operating both said first marking means and said second marking means to print said first identification mark and said second identification mark on an exterior of a film cartridge containing said film when at least one first image size and one second image size has been stored.

9. A method for operating a camera capable of switching a size of a photographing image between a first image size and a second image size which is different from the first image size, comprising first marking means making a first identification mark representing a first image size photograph, second marking means for making a second identification mark representing a second image size photograph, said method comprising the steps of:

(a) determining the image size selected for each photographing operation/and storing the selected image size;

(b) determining if an end of film has been reached;

(c) operating said first marking means to print only said first mark on a tongue portion of said film when only said first image size is stored;

(d) operating said second marking means to print only said second identification mark on a tongue portion of said film when only said second image size is stored; and (e) operating both said first marking means and said second marking means to print said first identification mark and said second identification mark on a tongue portion of the film containing said film when at least one first image size and one second image size has been stored; and (f) rewinding the film into a cartridge containing said film so that/the tongue portion containing an identification mark extends from said cartridge.

10. A method for operating a camera capable of switching a size of a photographing image between a first image size and a second image size which is different from the first image size comprising first marking means making a first identification mark representing a first image size photograph, second marking means for making a second identification mark representing a second image size photograph, said method comprising the steps of:

(a) determining the image size selected for each photographing operation an storing the selected image size;

(b) operating said first marking means to print said first mark on an exterior of a film cartridge containing said film responsive to detection of said first image size;

(c) operating said second marking means to print said second identification mark on an exterior of a film cartridge containing said film responsive to detection of said second image size; and (d) preventing further operation of said first and second marking means when the first and second marking means have been operated at least one time.

11. A method for operating a camera capable of switching a size of a photographing image between a first image size and a second image size which is different from the first image size comprising first marking means making a first identification mark representing a first image size photograph, second marking means for making a second identification mark representing a second image size photograph, said method comprising the steps of:

(a) determining the image size selected for each photographing operation and storing the selected image size;

(b) determining if an end of film has been reached;

(c) operating said first marking means to print only said first mark on an exterior of a film cartridge containing said film when only said first image size is stored;

(d) preventing operation of said first and second marking means when only said second image size is stored; and (e) operating both said first marking means and said second marking means to print said first identification mark and said second identification mark on an exterior of a film cartridge containing said film when at least one first image size and one second image size has been stored.

12. A method for operating a camera capable of switching a size of a photographing image between a first image size and a second image size which is different from the first image size, comprising first marking means making a first identification mark representing a first image size photograph, second marking means for making a second identification mark representing a second image size photograph; said method comprising the steps of:

(a) determining the image size selected for each photographing operation and storing the selected image size (b) determining if an end of film has been reached;

(c) operating said first marking means to print only said first mark on a tongue portion of said film when only said first image size is stored;

(d) preventing operation of said first and second marking means when only said second image size is stored; and (e) operating both said first marking means and said second marking means to print said first identification mark and said second identification mark on a tongue portion of said film when at least one first image size and one second image size has been stored; and (f) rewinding the film into a cartridge containing said film so that the tongue portion containing an identification mark extends from said cartridge.

* * * * *